(12) United States Patent
Brown et al.

(10) Patent No.: US 11,787,561 B2
(45) Date of Patent: Oct. 17, 2023

(54) ADAPTER ASSEMBLIES FOR AIRCRAFT AND LAUNCHERS FOR DEPLOYING AIRCRAFT

(71) Applicant: Insitu, Inc., Bingen, WA (US)

(72) Inventors: Harold A Brown, Seattle, WA (US); Danny Ray Nalley, Olympia, WA (US)

(73) Assignee: Insitu, Inc., Bingen, WA (US)

( * ) Notice: Subject to any disclaimer, the term of this patent is extended or adjusted under 35 U.S.C. 154(b) by 0 days.

(21) Appl. No.: 17/586,225

(22) Filed: Jan. 27, 2022

(65) Prior Publication Data

US 2022/0332434 A1    Oct. 20, 2022

Related U.S. Application Data

(60) Provisional application No. 63/177,214, filed on Apr. 20, 2021.

(51) Int. Cl.
| | |
|---|---|
| *B64F 1/06* | (2006.01) |
| *B64C 39/02* | (2023.01) |
| *B64U 10/25* | (2023.01) |
| *B64U 70/70* | (2023.01) |

(52) U.S. Cl.
CPC .............. *B64F 1/06* (2013.01); *B64C 39/024* (2013.01); *B64U 10/25* (2023.01); *B64U 70/70* (2023.01)

(58) Field of Classification Search
CPC ..... B64F 1/04; B64F 1/06; B64F 1/10; B64U 70/70; B64U 70/10; B64U 70/90; B64U 70/50; B64G 1/002; F42B 14/06; F41F 3/0406
See application file for complete search history.

(56) References Cited

U.S. PATENT DOCUMENTS

| 6,851,647 B1* | 2/2005 | Rosenbaum ............. B64F 1/06 244/63 |
|---|---|---|
| 2005/0151009 A1* | 7/2005 | Roeseler .................. B64F 1/06 244/63 |

(Continued)

FOREIGN PATENT DOCUMENTS

| CN | 108910073 A | * 11/2018 | ................ B64F 1/06 |
|---|---|---|---|
| CN | 109080844 A | * 12/2018 | ................ B64F 1/06 |

(Continued)

OTHER PUBLICATIONS

European Patent Office, "Extended European Search Report," issued in connection with European Appl. No. 22160588.4, dated Aug. 1, 2022, 9 pages.

*Primary Examiner* — Joshua J Michener
*Assistant Examiner* — Arfan Y. Sinaki
(74) *Attorney, Agent, or Firm* — HANLEY, FLIGHT & ZIMMERMAN, LLC

(57) ABSTRACT

Adapter assemblies for aircraft and launchers for deploying aircraft are described herein. An example adapter assembly for an unmanned aerial vehicle (UAV) includes a first adapter to be removeably coupled to a first side of a fuselage of the UAV. The first adapter includes first and second posts to interface with a carriage of a launcher. The adapter assembly also includes second adapter to be removeably coupled to a second side of the fuselage of the UAV. The second adapter includes third and fourth posts to interface with the carriage of the launcher.

20 Claims, 6 Drawing Sheets

(56) References Cited

U.S. PATENT DOCUMENTS

| | | | |
|---|---|---|---|
| 2005/0151014 A1* | 7/2005 | McGeer | B64C 39/024 244/120 |
| 2005/0178894 A1* | 8/2005 | McGeer | B64C 39/024 244/63 |
| 2005/0178895 A1* | 8/2005 | McGeer | B64C 39/024 244/63 |
| 2005/0230536 A1* | 10/2005 | Dennis | B64C 39/024 244/110 C |
| 2006/0038067 A1* | 2/2006 | Dennis | B64F 1/04 244/63 |
| 2006/0102783 A1* | 5/2006 | Dennis | B64F 1/222 244/110 F |
| 2006/0151667 A1* | 7/2006 | Dennis | B64F 1/06 244/63 |
| 2018/0354655 A1 | 12/2018 | Newhart et al. | |
| 2019/0337638 A1* | 11/2019 | Dennis | B64C 39/024 |
| 2019/0337640 A1* | 11/2019 | Dennis | B64B 1/50 |

FOREIGN PATENT DOCUMENTS

| | | | |
|---|---|---|---|
| CN | 111731501 A * | 10/2020 | B64F 1/06 |
| CN | 112455708 A * | 3/2021 | B64F 1/06 |
| EP | 0141672 | 5/1985 | |
| EP | 0141672 A1 * | 5/1985 | B64F 1/06 |
| EP | 4079635 | 10/2022 | |
| FR | 3097207 A1 * | 12/2020 | B64C 39/024 |
| KR | 20030050841 | 6/2003 | |

* cited by examiner

ADAPTER ASSEMBLIES FOR AIRCRAFT AND LAUNCHERS FOR DEPLOYING AIRCRAFT

RELATED APPLICATION

This patent claims the benefit under 35 U.S.C. § 119(e) to U.S. Provisional Application No. 63/177,214, titled "Adapter Assemblies for Aircraft and Launchers for Deploying Aircraft," filed Apr. 20, 2021, which is hereby incorporated by this reference in its entirety.

FIELD OF THE DISCLOSURE

This disclosure relates generally to aircraft and, more particularly, to adapter assemblies for aircraft and launchers for deploying aircraft.

BACKGROUND

Some aircraft, such as unmanned aerial vehicles (UAVs), are deployed with a launcher. The launcher accelerates the UAV to a relatively high speed within a short distance. This eliminates the need for a runway to deploy the UAV.

SUMMARY

An example adapter assembly for an unmanned aerial vehicle (UAV) is disclosed herein. The adapter assembly includes a first adapter to be removeably coupled to a first side of a fuselage of the UAV. The first adapter includes first and second posts to interface with a carriage of a launcher. The adapter assembly also includes a second adapter to be removeably coupled to a second side of the fuselage of the UAV. The second adapter includes third and fourth posts to interface with the carriage of the launcher.

An example system disclosed herein includes a launcher to deploy an unmanned aerial vehicle (UAV). The launcher includes a moveable carriage. The system also includes a first adapter to be removeably coupled to a first side of a fuselage of the UAV. The first adapter includes a first post to interface with the carriage. The system further includes a second adapter to be removeably coupled to a second side of the fuselage opposite the first side. The second adapter includes a second post to interface with the carriage.

An example method disclosed herein includes removeably coupling a first adapter to a first side of a fuselage of an aircraft. The first adapter includes first and second posts. The method also includes removeably coupling a second adapter to a second side of the fuselage of the aircraft opposite the first side. The second adapter includes third and fourth posts. The method further includes setting the aircraft on a carriage of a launcher and launching the aircraft with the launcher.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

A fixed wing aircraft, such as a fixed wing unmanned aerial vehicle (UAV) (e.g., a drone), is typically deployed from a runway or airstrip, similar to a commercial aircraft. However, this method of deploying a fixed wing UAV requires a relatively large amount of space to accommodate a runway. In other words, a relatively flat and open space is needed to launch the UAV. In many instances, such as in reconnaissance missions, runways are not readily available. Further, launching a UAV from an airstrip may result in the UAV and/or a remote operation station being exposed.

Some examples systems (e.g., an unmanned aerial system (UAS)) include a launcher to deploy a UAV. The launcher includes a carriage that is moveable along a track, which is relatively short compared to a runway. The UAV is set on or attached to the carriage, and the carriage accelerates rapidly along the track to propel the UAV into the air. Known launcher manufacturers provide specific UAVs with integrated structures or points for interfacing with their carriages. Therefore, only the manufacturer's UAVs can be launched from the launcher. However, other UAV manufacturers or UAV operators desire to utilize various launchers with their UAVs.

Disclosed herein are example adapter assemblies (which may also be referred to as adapters, brackets, or interfaces) that be used on various aircraft, such as a UAVs, to enable the UAVs to be deployed with a launcher. The example adapter assemblies can be removeably coupled to a UAV and interface with the specific structures on the carriage of the launcher. This enables UAVs that are not specifically designed or built for a specific launcher to be launched or deployed on the launcher. Further, various adapter assemblies can be constructed so that the same UAV can be launched with various types or styles of launchers. Further, the example adapter assemblies are removeably coupled to the UAV, such that the adapter assembly can be removed after use. This reduces the footprint and allows flexibility for on-site selection of a launcher and adapter.

Figure 1A:
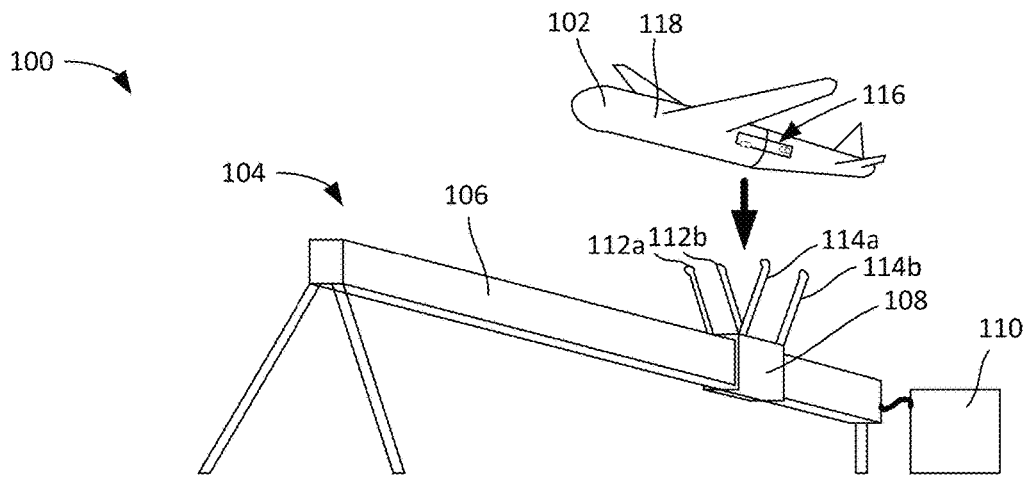
FIGS. 1A-1C illustrate an example sequence of launching an example unmanned aerial vehicle (UAV) with an example launcher.
Figure 1B:
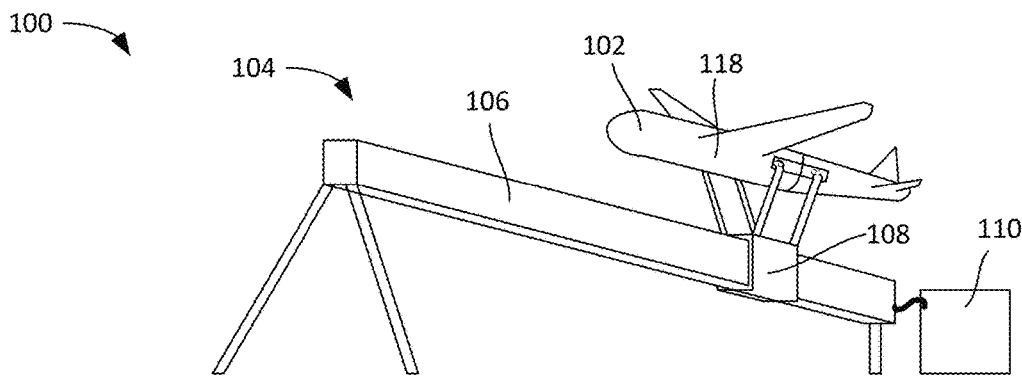
Figure 1C:
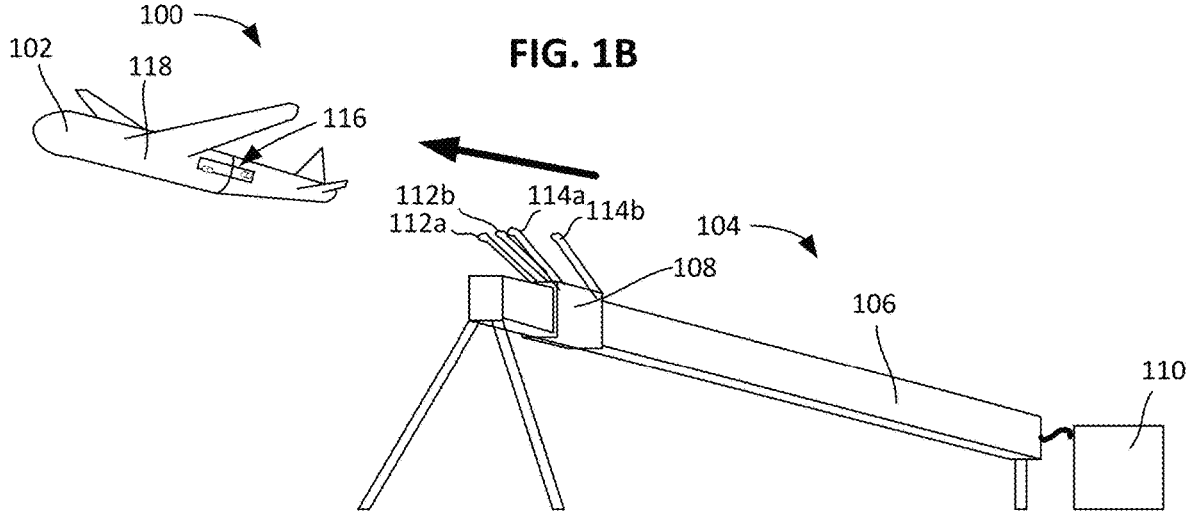

FIGS. 1A, 1B, and 1C show an example system 100 (e.g., a UAS) that may be used to deploy an aircraft 102. In this example, the aircraft 102 is an unmanned aerial vehicle (UAV), referred to herein as the UAV 102. However, in other examples, the aircraft 102 may be implemented as a manned aircraft. In the illustrated example, the UAV 102 is a fixed-wing aircraft. In other examples, the UAV 102 can be implemented as another type of aircraft.

The system 100 includes a launcher 104 to launch or deploy the UAV 102. In the illustrated example, the launcher 104 includes a track 106 and a carriage 108 that is moveable along the track 106. In some examples, the launcher 104 is pneumatically powered by a control module 110. When activated, the control module 110 supplies high pressure fluid (e.g., to a piston inside of the track 106) to rapidly accelerate the carriage 108 along the track 106. In the illustrated example, the carriage includes a first set of arms 112a, 112b and a second set of arms 114a, 114b (labeled in FIGS. 1A and 1C). In the illustrated example, the UAV 102 includes an example adapter assembly 116 that may be used to mount or interface the UAV 102 with the carriage 108. In the illustrated example, the adapter assembly 116 is coupled to a fuselage 118 of the UAV 102. However, in other examples, the adapter assembly 116 can be coupled to another part of the UAV 102.

As an example use application, the UAV 102 is set on the carriage 108. For example, as shown in FIG. 1A, the UAV 102 may be set downward on the arms 112a, 112b, 114a, 114b of the carriage 108 to the position shown in FIG. 1B. Then, as shown in FIG. 1C, the control module 110 can be activated to drive the carriage 108 along the track 106 to launch the UAV 102. When the carriage 108 reaches the end of the track 106, the carriage 108 stops, but the UAV 102 continues to move forward and releases from the carriage 108. In some examples, when the carriage 108 reaches the end of the track 106, the arms 112a, 112b, 114a, 114b rotate forward to help propel or launch the UAV 102 into the air. The launcher 104 provides sufficient acceleration to launch the UAV 102 into the air. Then, one or more thrust generators (e.g., propellers, turbo-jet engines, etc.) on the UAV 102 can be activated to continue to fly the UAV 102. Launchers are advantageous because they eliminate the need for a long runway.

Figure 2:
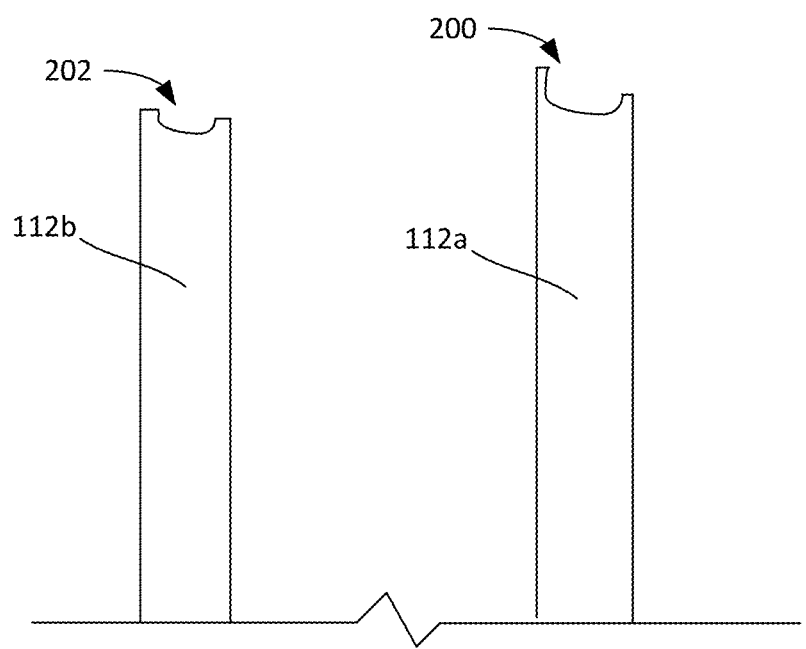
FIG. 2 is a side view of a first set of example arms of an example carriage of the example launcher of FIGS. 1A-1C.

FIG. 2 is a side view of the first set of arms 112a, 112b. In the illustrated example, the first arm 112a has a first interface point 200 and the second arm 112b has a second interface point 202. The first and second interface points 200, 202 define where the UAV 102 engages or otherwise interfaces with the carriage 108 (FIGS. 1A-1C). In this example, the first and second interface points 200, 202 are notches formed in the ends of the first set of arms 112a, 112b. In other examples, the first and/or second interface points 200, 202 can have different shapes and/or structures. The example adapter assembly 116 (FIGS. 1A and 1C) has corresponding features that interface with the first and second interface points 200, 202. The second set of arms 114a, 114b (FIGS. 1A and 1C) are substantially the same as the first set of arms 112a, 112b. Thus, any of the example structural or functional features disclosed in connection with the first set of arms 112a, 112b can likewise apply to the second set of arms 114a, 114b.

Figure 3:
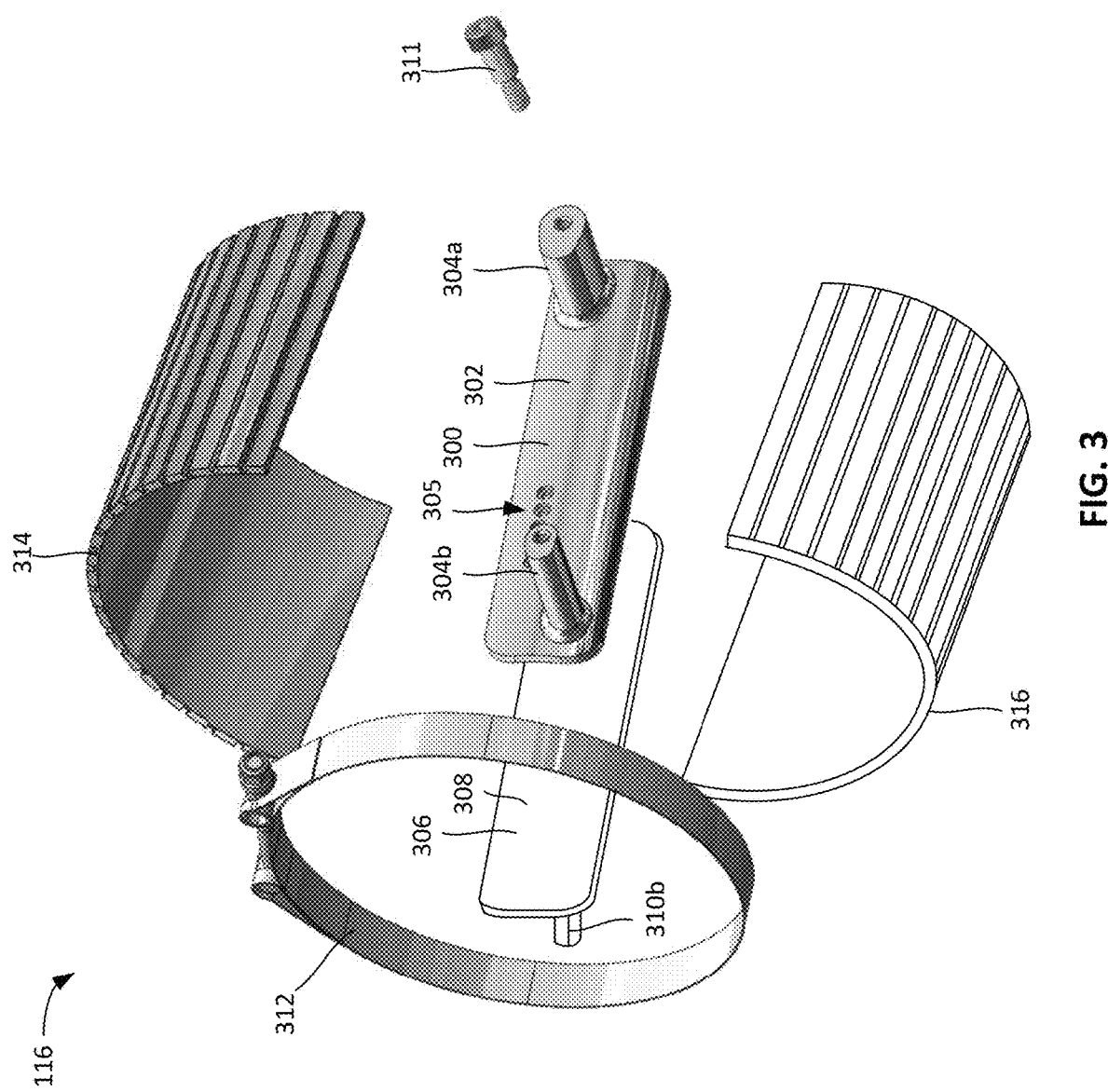
FIG. 3 is an exploded view of an example adapter assembly that can be removeably coupled to the example UAV of FIGS. 1A-1C to provide an interface between the example UAV of FIGS. 1A-1C and the example carriage of FIGS. 1A-1C.

FIG. 3 is an exploded view of an example adapter assembly 116. The adapter assembly 116 includes a first adapter 300 that is to be removeably coupled to a first side (e.g., a left side) of the fuselage 118 (FIG. 1A) of the UAV 102 (FIG. 1A). The first adapter 300 provides an interface between the UAV 102 and the carriage 108 (e.g., the first set of arms 112a, 112b of the carriage 108 shown in FIG. 1A). In the illustrated example, the first adapter 300 includes a first plate 302 and first and second posts 304a, 304b extending from the first plate 302. The first and second posts 304a, 304b may also be referred to as first posts or a first set of posts. The first and second posts 304a, 304b are to interface with the carriage 108 of the launcher 104. For example, the first and second posts 304a, 304b are spaced apart according to (e.g., to equal) the spacing between the first set of arms 112a, 112b. Further, the first and second posts 304a, 304b are shaped to match the first and second interface points 200, 202 (FIG. 2) (e.g., the notches), respectively, on the first set of arms 112a, 112b (FIG. 2). For example, the first post 304a has a shape corresponding to (e.g., complementary to) the first notch of the first arm 112a and the second post 304b has a shape corresponding to (e.g., complementary to) the second notch of the second arm 112b. In other examples, the first and second posts 304a, 304b may have a smaller shape and/or size than the first and second interface points 200, 202. When the UAV 102 (FIGS. 1A-1C) is set on the carriage 108 (FIGS. 1A-1C), the first and second posts 304a, 304b sit or rest in the first and second interface points 200, 202 (e.g., notches), respectively, of the first set of arms 112a, 112b to support the UAV 102.

In some examples, the first and second posts 304a, 304b have the same cross-sectional shape and size. However, in other examples, such as shown in FIG. 3, the first and second posts 304a, 304b may be shaped and/or sized differently. For example, the first and second posts 304a, 304b can have different cross-sectional shapes and sizes. The first and second posts 304a, 304b can be constructed longer or shorter depending on the size (e.g., width) of the UAV 102 (FIGS. 1A-1C) and the location of the corresponding interface points on the carriage 108 (FIGS. 1A-1C). For example, if the fuselage 118 (FIGS. 1A-1C) of the UAV 102 is relatively small, the first and second posts 304a, 304b can be longer to ensure the first and second posts 304a, 304b extend outward enough to reach the interface points on the carriage 108. While in this example the first adapter 300 includes two posts, in other examples, the first adapter 300 may include more or fewer posts (e.g., one post, three posts, etc.) depending on the number of interface points on the corresponding carriage. In some examples, as shown in FIG. 3, the first plate 302 can include one or more locator holes 305. The locator holes 305 can be used to position the first adapter 300 in a specific a location on the side of the fuselage 118 of the UAV 102.

Figure 4:
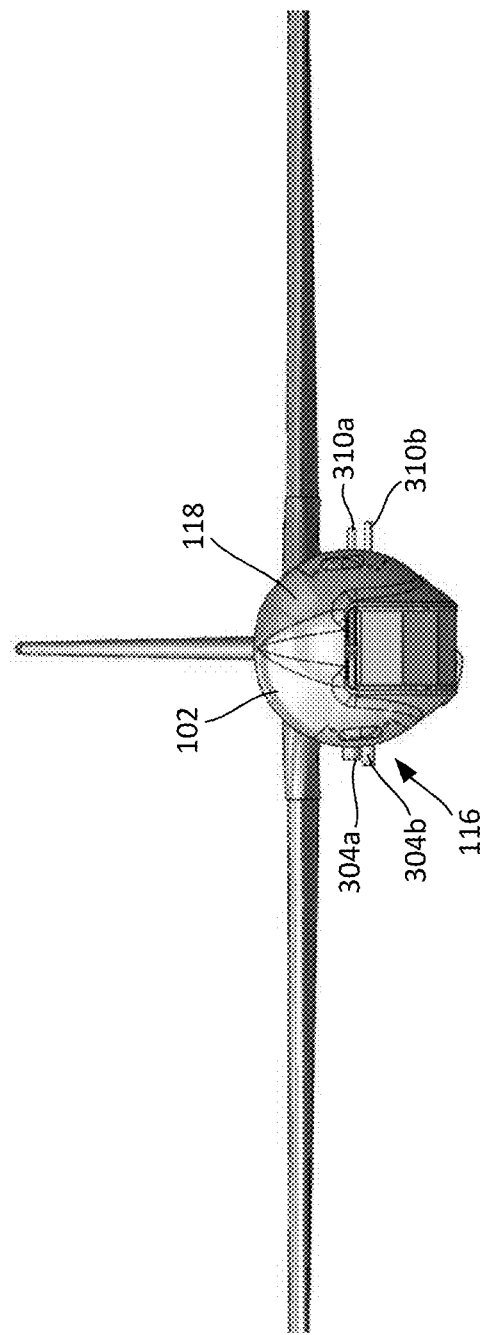
FIG. 4 is a front view of the example UAV of FIGS. 1A-1C with the example adapter assembly of FIG. 3.

In the illustrated example, the adapter assembly 116 includes a second adapter 306 that is substantially the same as the first adapter 300 (except the arrangement of the posts is mirrored). Thus, any of the example structural and/or functional features disclosed in connection with the first adapter 300 can likewise apply to the second adapter 306. The second adapter 306 includes a second plate 308 and third and fourth posts 310a, 310b (the third post 310a is shown in FIG. 4) extending from the second plate 308. The third and fourth posts 310a, 310b may be referred to as second posts or a second set of posts. The third and fourth posts 310a, 310b similarly interface with the carriage 108 (FIGS. 1A-1C) of the launcher 104 (FIGS. 1A-1C). In particular, when the UAV 102 is set on the carriage 108, the third and fourth posts 310a, 310b sit or rest in the interface points (e.g., notches), respectively, of the second set of arms 114a, 114b to support the UAV 102.

In some examples, instead of the posts 304a, 304b, 310a, 310b interfacing (e.g., contacting) the interface points of the carriage 108, the adapter assembly 116 includes one or more bolts (e.g., shoulder bolts) that can interface with the interface points on the carriage 108. For example, as shown in FIG. 3, a bolt 311 can be threaded into the end of the first post 304a. When the UAV 102 is set on the carriage 108, the bolt 311 sits in the first interface point 200 (FIG. 2) of the first arm 112a. Other bolts can be similarly coupled to the ends of the other posts 304b, 310a, 310b.

In some examples, the first and second adapters 300, 306 are constructed of aluminum. In other examples the first and/or second adapters 300, 306 are constructed of one or more materials, such as titanium or a composite (e.g., carbon fiber).

In some examples, to removeably couple the first and second adapters 300, 306 to the fuselage 118 (FIGS. 1A-1C) of the UAV 102 (FIGS. 1A-1C), the adapter assembly 116 includes a clamp 312. The clamp 312 extends around the fuselage 118 of the UAV 102 to secure (e.g., clamp) the first and second adapters 300, 306 to the sides of the fuselage 118. In this example, the clamp 312 is a band clamp. In other examples, other types of clamps can be used. Further, in other examples, the first and/or second adapters 300, 306 can be removeably coupled to the UAV 102 using other techniques (e.g., an elastomeric ring, a zip tie, a threaded fastener (bolts, screws, etc.), an adhesive, a latch, etc.).

In some examples, the adapter assembly 116 includes a first spacer 314 and a second spacer 316 to be disposed around the top and bottom sides of the fuselage 118 (FIGS. 1A-1C) to fill any gaps between the clamp 312 and the fuselage 118 of the UAV 102 when tightening the clamp 312. In some examples, the first and second spacers 314, 316 are constructed of acrylonitrile butadiene styrene (ABS) plastic. In other examples, the first and/or second spacers 314, 316 can be constructed of other materials. In the illustrated example, the first and second spacers 314, 316 are scored to improve flexibility.

FIG. 4 is a front view of the UAV 102 showing the adapter assembly 116 coupled to the UAV 102. As shown in FIG. 4, the first and second posts 304a, 304b of the first adapter 300 (FIG. 3) extend outward from a first side of the fuselage 118, and the third and fourth posts 310a, 310b of the second adapter 306 (FIG. 3) extend outward from a second side of the fuselage 118. When the UAV 102 is set downward onto the carriage 108 (FIGS. 1A-1C), the first and second posts 304a, 304b sit in the interface points (e.g., notches) in the first set of arms 112a, 112b, respectively, and the third and fourth posts 310a, 310b sit in the interface points (e.g., notches) in the second set of arms 114a, 114b, respectively. As such, the first and second adapters 300, 306 enable the UAV 102 to be launched with the launcher 104.

Figure 5:
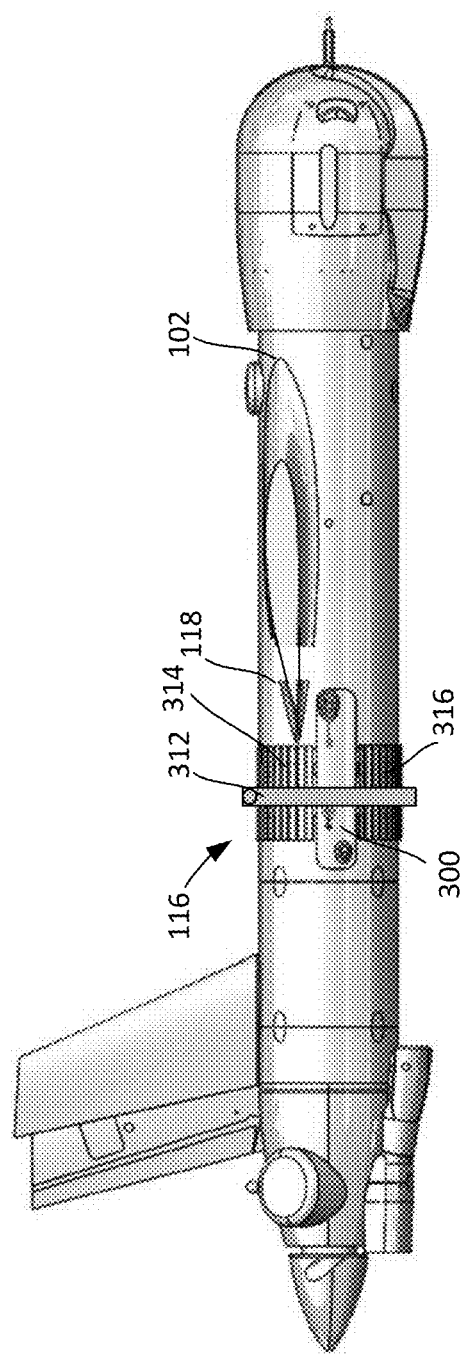
FIG. 5 is a side view of the example UAV of FIGS. 1A-1C with the example adapter assembly of FIG. 3.

FIG. 5 is a side view of the UAV 102 showing the adapter assembly 116 coupled to the UAV 102. As shown in FIG. 5, the first adapter 300 is coupled to a side of the fuselage 118. The second adapter 306 (FIG. 3) is similarly coupled to the opposite side of the fuselage 118. In some examples, the first and second adapters 300, 306 are in direct contact with the sides of the fuselage 118. In other examples, one or more spacers can be disposed between the first and/or second adapters 300, 306 and the sides of the fuselage 118. Spacers can be used to position the first and second adapters 300, 306 more outward from the sides of the fuselage 118.

In the illustrated example, the first spacer 314 is disposed on a top side of the fuselage 118 between the fuselage 118 and the clamp 312. Further, the second spacer 316 is disposed on a bottom side of the fuselage 118 between the fuselage 118 and the clamp 312. As disclosed above, the first and second spacers 314, 316 fill any gap or space between the clamp 312 and the fuselage 118. The clamp 312 encircles the fuselage 118 and is tightened to clamp the first and second adapters 300, 306 to the sides of the fuselage 118, thereby removeably coupling the first and second adapters 300, 306 to the fuselage 118 for the UAV 102. In some examples, the clamp 312 is positioned between the posts of the first and second adapters 300, 306. In other examples, the clamp 312 can be positioned outside of the posts (e.g., closer to one end of the first and second adapters 300, 306). In some examples, multiple clamps can be used (e.g., two or three clamps can be used). In some examples, in addition to or as an alternative to the clamp 312, one or more threaded fasteners (e.g., bolts) can be threaded through the first and second adapters 300, 306 and into the sides of the fuselage 118 to removeably coupled the first and second adapters 300, 306 to the UAV 102.

Figure 6:
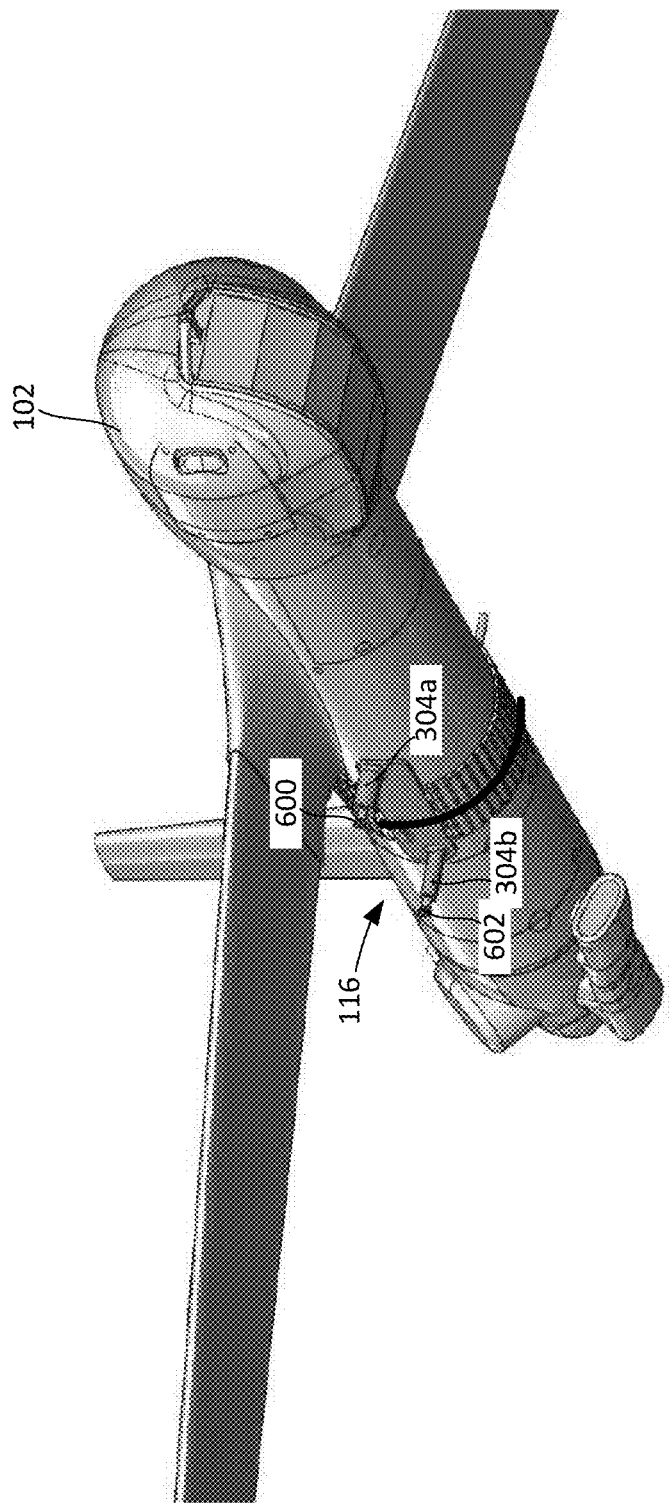
FIG. 6 is a perspective view of the example UAV of FIGS. 1A-1C with the example adapter assembly of FIG. 3.

FIG. 6 is a perspective view of the UAV 102 showing the adapter assembly 116 coupled to the UAV 102. In this example, bolts 600, 602 are shown on the ends of the first and second posts 304a, 304b. As disclosed above, in some examples, the bolts 600, 602 can be used to engage the interface points (e.g., notches) on the carriage 108. However, in other examples, the posts 304a, 304b, 310a, 310b engage or otherwise interface with the interface points on the carriage 108.

In some examples, various adapter assemblies can be designed for different launchers that have different interface points. Depending on the type of launcher being used, the corresponding adapter assembly can be coupled to the UAV 102. For example, a first type of adapter assembly can be removeably coupled to the UAV 102 and used when launching the UAV 102 with a first type of launcher. Then, the first type of adapter assembly can be removed and a second type of adapter assembly can be removeably coupled to the UAV 102 and used when launching the UAV 102 with a second type of launcher. As a result, the UAV 102 can be used with any type or style of launcher. Further, an adapter assembly can be removed from the UAV 102 and coupled to another UAV 102. Thus, the adapter assemblies disclosed herein are easily transferable.

Also, because the adapter assembly 116 is not permanently coupled to the UAV 102, the adapter assembly 116 can be removed when not being used with the launcher 104. For example, if the UAV 102 is being deployed via a regular runway, the adapter assembly 116 can be removed, which reduces weight and drag of the UAV 102.

Figure 7:
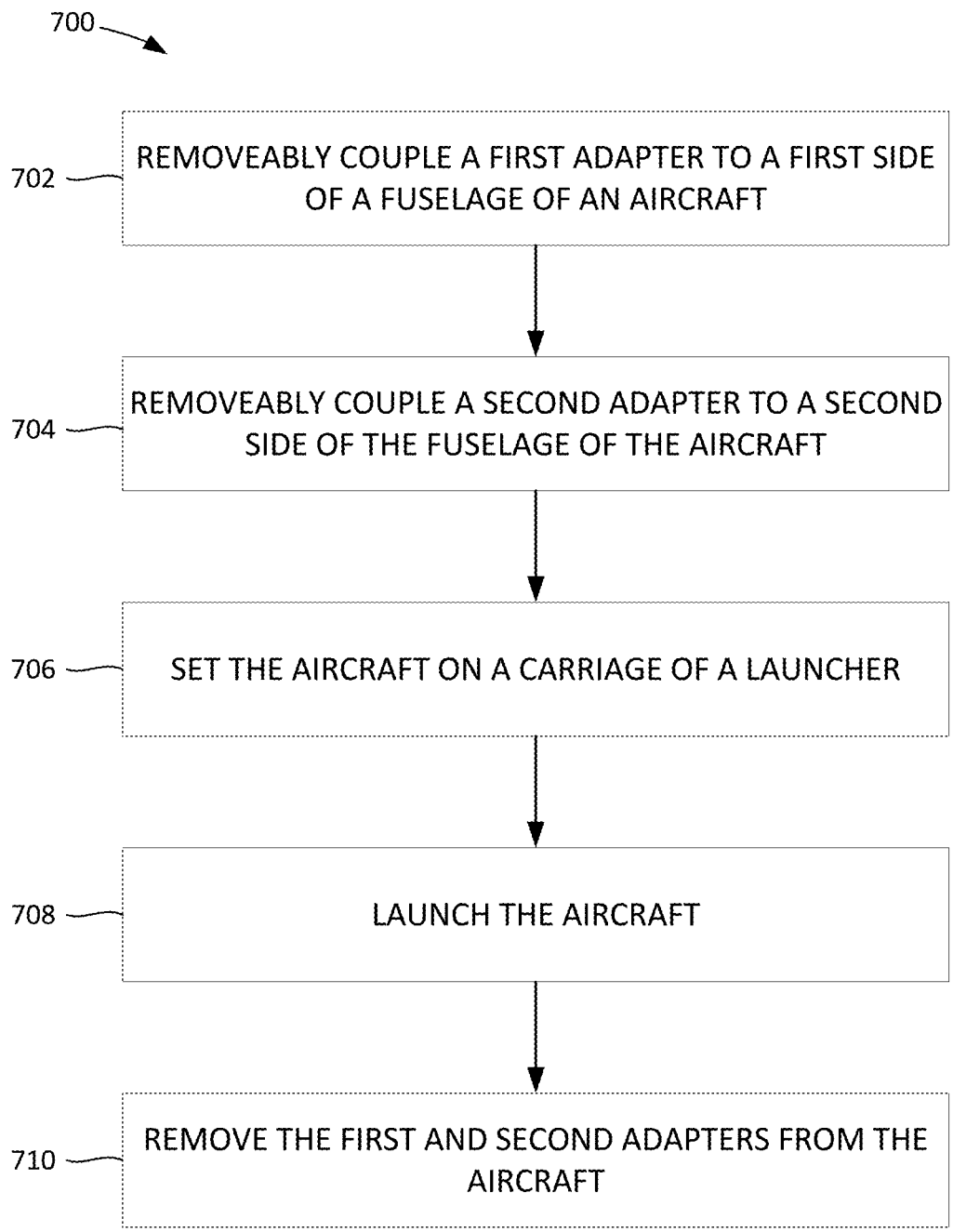
FIG. 7 is a flowchart representative of an example method of using the example adapter assembly of FIG. 3 to launch the example UAV.

FIG. 7 is an example method 700 of using an example adapter assembly when launching an aircraft from a launcher. The example method is disclosed in connection with the example UAV 102, the example launcher 104, and the example adapter assembly 116 of the example system 100. However, it is understood the example method 700 could be implemented in connection with other types of aircraft, launchers, and/or adapter assemblies.

An adapter assembly, such as the adapter assembly 116, can be selected on site or off site for compatibility with a particular launcher. At block 702, the first adapter 300 is removeably coupled to a first side of the fuselage 118 of the UAV 102. At block 704, the second adapter 306 is removeably coupled to a second side of the fuselage 118 of the UAV 102. In some examples, the first and second adapters 300, 306 are removeably coupled to the fuselage 118 of the UAV 102 using the clamp 312. For example, the first adapter 300 can be held (e.g., via a user or a temporary fixing mechanism) on the first side of the fuselage 118, and the second adapter 306 can be held on the second side of the fuselage 118. Then, the clamp 312 is placed around the fuselage 118 and the first and second adapters 300, 306. The clamp 312 is tightened, thereby coupling the first and second adapters 300, 306 to the UAV 102. In some examples, prior to tightening the clamp 312, the first and second spacers 314, 316 are placed around the top and bottom sides of the fuselage 118.

At block 706, the UAV 102 is set on the carriage 108 of the launcher 104. For example, the first and second posts 304a, 304b of the first adapter 300 are set in the interface points (e.g., notches) of the first set of arms 112a, 112b, and the third and fourth posts 310a, 310b of the second adapter 306 are set in the interface points (e.g., notches) of the second set of arms 114a, 114b. Thus, the first and second adapters 300, 306 enable the UAV 102 to interface with the carriage 108 and support the UAV 102 on the carriage.

At block 708, the launcher 104 is activated (e.g., via the control module 110) to launch the UAV 102. After the UAV 102 lands and the flight is over, at block 710, the first and second adapters 300, 306 can be removed from the UAV 102. For example, the clamp 312 can be loosened, and the first and second adapters 300, 306 can be taken off of the sides of the fuselage 118. The adapter assembly 116 can be used again with the UAV 102 or with another UAV. Further, another adapter assembly can be removeably coupled to the UAV 102 and used to launch the UAV 102 from another type of launcher.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus, and articles of manufacture have been disclosed that enable an aircraft, such as a UAV, to interface with a carriage of a launcher. As such, various types, shapes, styles, etc. of UAVs can be used with the same launcher. Further, the example disclosed herein enable the same UAV to be used with various styles or types of launchers.

Examples and example combinations disclosed herein include the following:

Example 1 is an adapter assembly for an unmanned aerial vehicle (UAV). The adapter assembly includes a first adapter to be removeably coupled to a first side of a fuselage of the UAV. The first adapter includes first and second posts to interface with a carriage of a launcher. The adapter assembly also includes a second adapter to be removeably coupled to a second side of the fuselage of the UAV. The second adapter includes third and fourth posts to interface with the carriage of the launcher.

Example 2 includes the adapter assembly of Example 1, wherein the first adapter includes a first plate. The first and second posts extend from the first plate.

Example 3 includes the adapter assembly of Example 2, wherein the second adapter includes a second plate. The third and fourth posts extend from the second plate.

Example 4 includes the adapter assembly of any of Examples 1-3, wherein the first and second adapters are constructed of aluminum.

Example 5 includes the adapter assembly of any of Examples 1-4, further including a clamp to couple the first adapter and the second adapter to the fuselage of the UAV.

Example 6 includes the adapter assembly of Example 5, further including a first spacer to be disposed on a top side of the fuselage between the fuselage and the clamp.

Example 7 includes the adapter assembly of Example 6, further including a second spacer to be disposed on a bottom side of the fuselage between the fuselage and the clamp.

Example 8 includes the adapter assembly of Example 7, wherein the first and second spacers are constructed of acrylonitrile butadiene styrene (ABS) plastic.

Example 9 includes the adapter assembly of any of Examples 1-8, wherein the first and second posts have different cross-sectional shapes and sizes.

Example 10 is a system including a launcher to deploy an unmanned aerial vehicle (UAV). The launcher includes a moveable carriage. The system includes a first adapter to be removeably coupled to a first side of a fuselage of the UAV. The first adapter includes a first post to interface with the carriage. The system also includes a second adapter to be removeably coupled to a second side of the fuselage opposite the first side. The second adapter includes a second post to interface with the carriage.

Example 11 includes the system of Example 10, wherein the carriage has a first arm with a first notch and a second arm with a second notch. The first post has a shape corresponding to the first notch of the first arm, and the second post has a shape corresponding to the second notch of the second arm.

Example 12 includes the system of Examples 10 or 11, further including a clamp to removeably couple the first adapter and the second adapter to the fuselage of the UAV.

Example 13 includes the system of Example 12, further including spacers to be disposed between the clamp and the fuselage of the UAV.

Example 14 includes the system of any of Examples 10-13, wherein the first adapter includes a first plate. The first post extends from the first plate. The second adapter includes a second plate. The second post extends from the second plate.

Example 15 includes the system of any of Examples 10-14, wherein the first and second adapters are constructed of aluminum.

Example 16 is method including removeably coupling a first adapter to a first side of a fuselage of an aircraft. The first adapter includes first and second posts. The method also includes removeably coupling a second adapter to a second side of the fuselage of the aircraft opposite the first side. The second adapter includes third and fourth posts. The method further includes setting the aircraft on a carriage of a launcher and launching the aircraft with the launcher.

Example 17 includes the method of Example 16, wherein the carriage has a first set of arms with notches and a second set of arms with notches, and wherein setting the aircraft on the carriage includes setting the first and second posts in the notches of the first set of arms and setting the third and fourth posts in the notches of the second set of arms.

Example 18 includes the method of Examples 16 or 17, wherein removeably coupling the first adapter to the first side of the fuselage and removeably coupling the second adapter to the fuselage includes clamping, via a clamp, the first and second adapters to the first and second sides, respectively, of the fuselage.

Example 19 includes the method of any of Examples 16-18, further including removing the first and second adapters from the aircraft.

Example 20 includes the method of any of Examples 16-19, wherein the aircraft is an unmanned aerial vehicle (UAV).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An adapter assembly for an unmanned aerial vehicle (UAV), the adapter assembly comprising:
   a first adapter to be disposed on a first side of a fuselage of the UAV, the first adapter including first and second posts to interface with a carriage of a launcher;
   a second adapter to be disposed on a second side of the fuselage of the UAV, the second adapter including third and fourth posts to interface with the carriage of the launcher; and
   a clamp to couple the first and second adapters to the fuselage of the UAV such that the first and second adapters remain coupled to the fuselage after the UAV is released from the carriage of the launcher.

2. The adapter assembly of claim 1, wherein the first adapter includes a first plate, the first and second posts extending from the first plate.

3. The adapter assembly of claim 2, wherein the second adapter includes a second plate, the third and fourth posts extending from the second plate.

4. The adapter assembly of claim 3, wherein the clamp is a circular band clamp to be disposed around the fuselage of the UAV and engage the first and second plates of the first and second adapters to clamp the first and second adapters against the fuselage of the UAV.

5. The adapter assembly of claim 4, wherein the clamp is to be disposed between the first and second posts of the first adapter and between the third and fourth posts of the second adapter.

6. The adapter assembly of claim 1, wherein the first and second adapters are constructed of aluminum.

7. The adapter assembly of claim 1, further including a first spacer to be disposed on a top side of the fuselage between the fuselage and the clamp.

8. The adapter assembly of claim 7, further including a second spacer to be disposed on a bottom side of the fuselage between the fuselage and the clamp.

9. The adapter assembly of claim 8, wherein the first and second spacers are constructed of acrylonitrile butadiene styrene (ABS) plastic.

10. The adapter assembly of claim 1, wherein the first and second posts have different cross-sectional shapes and sizes.

11. The adapter assembly of claim 1, wherein the first, second, third, and fourth posts have circular cross-sectional shapes.

12. A system comprising: a launcher to deploy an unmanned aerial vehicle (UAV), the launcher including a moveable carriage, the carriage having a first arm with a first notch and a second arm with a second notch; a first adapter to be removably coupled to a first side of a fuselage of the UAV, the first adapter including a first post to interface with the carriage, the first post having a shape corresponding to the first notch of the first arm; and a second adapter to be removably coupled to a second side of the fuselage opposite the first side, the second adapter including a second post to interface with the carriage, the second post having a shape corresponding to the second notch of the second arm.

13. The system of claim 12, further including a clamp to removably couple the first adapter and the second adapter to the fuselage of the UAV.

14. The system of claim 13, further including spacers to be disposed between the clamp and the fuselage of the UAV.

15. The system of claim 12, wherein the first adapter includes a first plate, the first post extending from the first plate, and wherein the second adapter includes a second plate, the second post extending from the second plate.

16. The system of claim 12, wherein the first and second adapters are constructed of aluminum.

17. A method comprising: removably coupling a first adapter to a first side of a fuselage of an aircraft, the first adapter including first and second posts; removably coupling a second adapter to a second side of the fuselage of the aircraft opposite the first side, the second adapter including third and fourth posts; setting the aircraft on a carriage of a launcher, where in the carriage has a first set of arms with notches and a second set of arms with notches, and wherein setting the aircraft on the carriage includes setting the first and second posts in the notches of the first set of arms and setting the third and fourth posts in the notches of the second set of arms; and launching the aircraft with the launcher.

18. The method of claim 17, further including removing the first and second adapters from the aircraft.

19. The method of claim 17, wherein the aircraft is an unmanned aerial vehicle (UAV).

20. A method comprising: clamping, via a clamp, first and second adapters to first and second sides, respectively, of a fuselage of an aircraft to removably couple the first and second adapters to the fuselage of the aircraft, the first adapter including first and second posts, the second adapter including third and fourth posts; setting the aircraft on a carriage of a launcher; and launching the aircraft with the launcher.

\* \* \* \* \*